No. 790,464. PATENTED MAY 23, 1905.
H. W. TOLER.
COMBINED GRUBBING, SUBSOILING, AND TURNING PLOW.
APPLICATION FILED JAN. 21, 1905.

Witnesses
Robert A. Boswell
A. L. Hough

Inventor
Henry W. Toler,
By Franklin H. Hough
Attorney

No. 790,464.  Patented May 23, 1905.

UNITED STATES PATENT OFFICE.

HENRY WILSON TOLER, OF LONGVIEW, TEXAS.

COMBINED GRUBBING, SUBSOILING, AND TURNING PLOW.

SPECIFICATION forming part of Letters Patent No. 790,464, dated May 23, 1905.

Application filed January 21, 1905. Serial No. 242,117.

*To all whom it may concern:*

Be it known that I, HENRY WILSON TOLER, a citizen of the United States, residing at Longview, in the county of Gregg and State of Texas, have invented certain new and useful Improvements in a Combined Grubbing, Subsoiling, and Turning Plow; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in plows; and the object of the invention is to produce a simple and efficient device of this nature whereby the apparatus may be readily adjusted to accomplish the various purposes referred to.

The invention is illustrated in the accompanying drawings, which, with the letters of reference marked thereon, form a part of this application, and in which—

Figure 1:
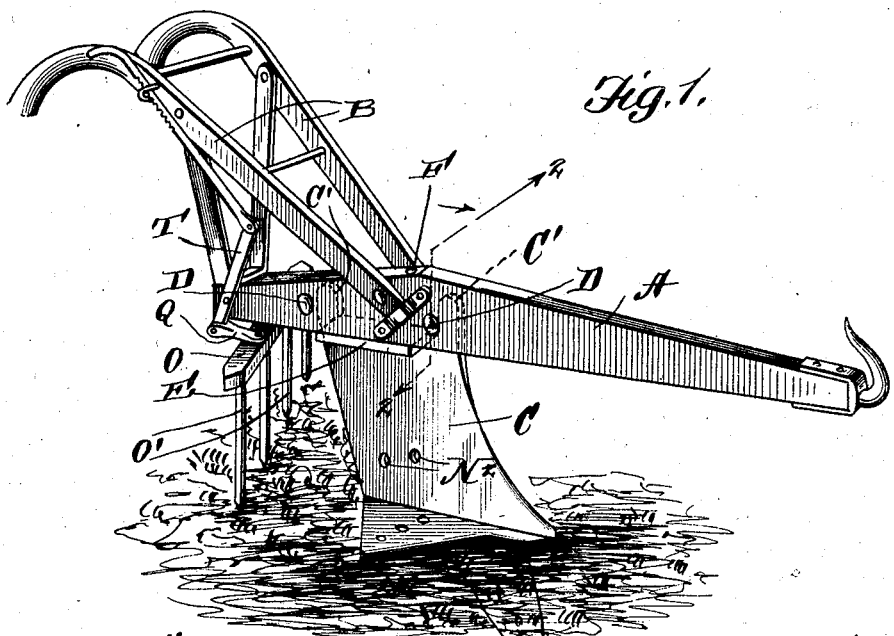
Figure 3:
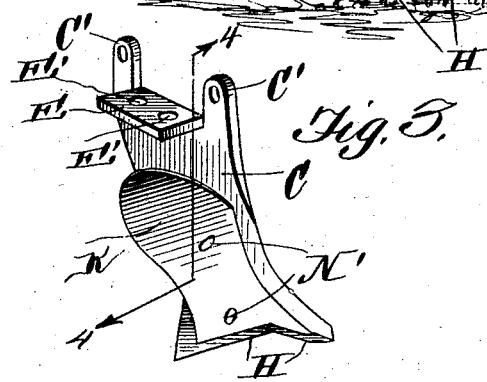
Figure 2:
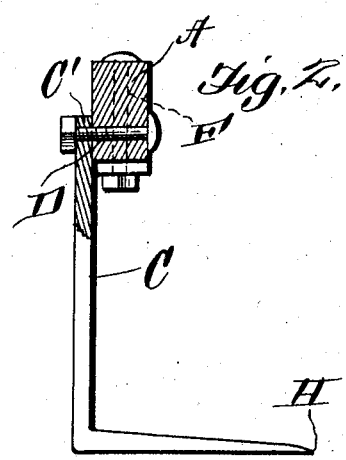
Figure 4:
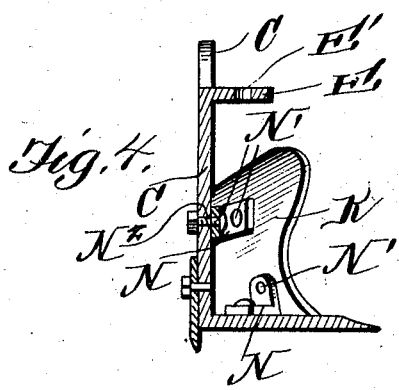

Figure 1 is a perspective view of my improved plow, showing the same adjusted for a subsoiler and grubber. Fig. 2 is a sectional view on line 2 2 of Fig. 1. Fig. 3 is a detail view showing a turning-plow adjusted to the subsoiler. Fig. 4 is a detail view on line 4 4 of Fig. 3.

Reference now being had to the details of the drawings by letter, A designates a plow-beam of the usual construction, having handles B, which are securely braced and bolted to the beam in the usual manner.

C designates a subsoiling-plow having the lugs C' at the upper end thereof, which are apertured to receive bolts D, and a portion E of the upright portion of said subsoiling-plow is bent at right angles and has perforations E' for the reception of bolts F, passed through the plow-beam, as shown in Fig. 1 of the drawings. The lower portion of the subsoiling-plow is bent at right angles and has the angled cutting edges H, and is adapted for use in loosening hard soil underneath the surface and also for grubbing.

Referring to Fig. 4 of the drawings, K designates a turning-plow having arms N, with apertures N' therein, which are adapted to receive bolts $N^3$, the upper of which bolts passes through an aperture $N^2$ in the upright shank portion of the subsoiling-plow, the other of said arms being bolted to the lower angled portion of the plow. When the turning-plow is fastened to the subsoiler, as shown in Fig. 3 of the drawings, it will be observed that the lower edge of the turning-plow rests upon the upper surface of the subsoiler while the inclined edge of the turning-plow is in contact with one face of the upright portion of the subsoiler.

Referring to Fig. 1 of the drawings, I have shown a harrow attachment comprising a bar O, having fingers O' projecting therefrom. Said bar O is pivotally connected to the beam, and Q designates a rod which is pivotally connected to said bar at one end, and its other end is pivotally connected to one end of the angle-lever T, which is pivotally mounted upon the handles of the plow and provided for the purpose of adjusting the angle at which it is desired to have said bar disposed.

From the foregoing it will be observed that by the provision of the apparatus shown and described I provide means whereby the subsoiling-plow may be converted into a turning-plow or pulverizing-plow by the simple interchange of the parts shown.

While I have shown a particular form of apparatus illustrating my invention, it will be understood that I may vary the details of the same, if desired, without in any way departing from the spirit of the invention.

Having thus fully described my invention, what I claim as new, and desire to secure by Letters Patent, is—

In combination with the plow-beam, a subsoiler having its upper portion bent at right angles and bolted to the under edge of a plow-beam, lugs projecting from the subsoiler and bolted to the side of the beam, a turning-plow having apertured arms projecting from the rear face thereof, bolts passing through registering apertures in said arms and the upright portion of the subsoiler, said turning-plow being adapted to rest upon the lower angled end of the subsoiler, as shown and described.

In testimony whereof I hereunto affix my signature in presence of two witnesses.

HENRY WILSON TOLER.

Witnesses:
S. R. THRASHER,
D. W. WOOD.